May 3, 1966 P. S. VILES 3,249,529
CATALYTIC CONVERSION OF HYDROCARBONS
Filed July 31, 1963
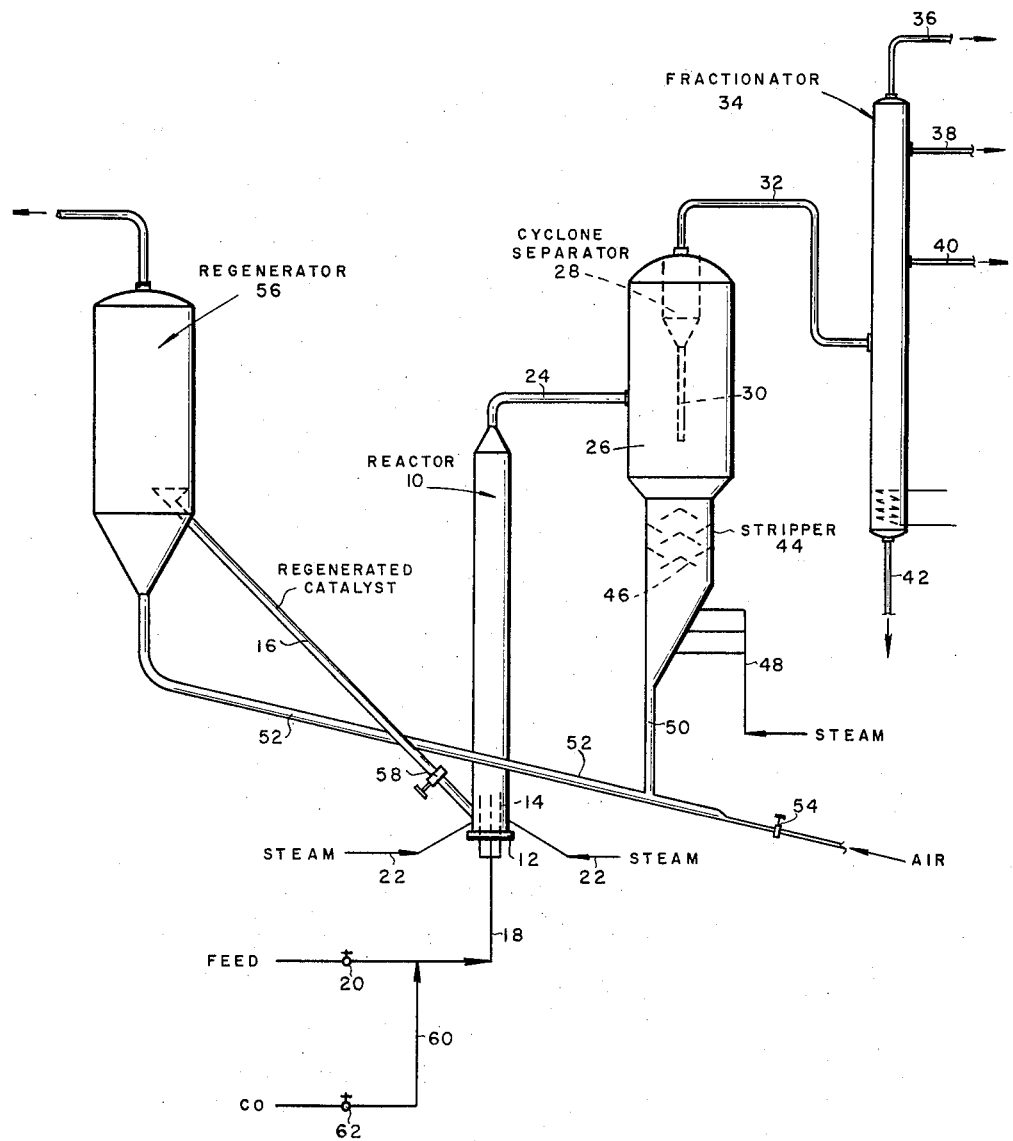
INVENTOR.
PRENTISS S. VILES,
BY Frank S. Troidl
ATTORNEY.

United States Patent Office 3,249,529
Patented May 3, 1966

3,249,529
CATALYTIC CONVERSION OF HYDROCARBONS
Prentiss S. Viles, Baytown, Tex., assignor, by mesne assignments, to Esso Research and Engineering Company, Elizabeth, N.J., a corporation of Delaware
Filed July 31, 1963, Ser. No. 298,920
1 Claim. (Cl. 208—120)

This invention relates to the catalytic cracking of hydrocarbon oils. More particularly, this invention is a process for the catalytic cracking of hydrocarbon oils to form low-boiling products containing more aromatics and olefins than formerly obtained by conventional processes.

The constantly increasing octane number quality requirements of motor gasolines have rendered the catalytic naphthas produced by the presently used catalytic cracking operations marginal gasoline components. The aromatic compounds, however, which are present in the catalytic naphthas have very good octane number quality characteristics. The product quality requirements have become so exacting that it becomes increasingly more desirable to produce catalytic naphthas which contain higher amounts of aromatics. The invention to be described herein provides the art with a process for the catalytic cracking of hydrocarbon oils which has a higher selectivity to the production of aromatics than the selectivity formerly obtainable. In addition, this new process increases the amount of olefins in the gaseous fraction which is a significant economic credit to the process.

Briefly described, the new process includes the introduction of carbon monoxide to the catalytic reaction zone. A sufficient quantity of carbon monoxide is added to the catalytic reaction zone to maintain a slight excess of carbon monoxide throughout the catalytic reaction zone. The slight excess of carbon monoxide produces maximum formation of aromatics and olefins. The thus-formed product is recovered from the catalytic reaction zone for separation into its constitutents.

The invention may be practiced with feedstocks such as crude petroleum fractions boiling in the range from about 100° F. to about 1300° F. Thus, the invention may be practiced with gasoline fractions, kerosene fractions, middle distillate or heating oil fractions, process gas oil fractions, and vacuum gas oil fractions. A valuable feedstock is a crude petroleum fraction such as one of those in the range indicated. A preferred feedstock is a gas oil fraction which may be a converted fraction or virgin crude petroleum fraction.

Pressures may suitably range from about atmospheric pressure up to about 50 p.s.i.g. A suitable pressure may range from about atmospheric pressure to about 30 p.s.i.g.

The catalytic cracking system utilized in practicing this new process may be any conventional catalytic cracking system. This includes the well-known fluid catalytic cracking systems and the "fixed bed" catalytic cracking systems. A silica-alumina catalyst may suitably be employed, but silica-magnesia and silica-zirconia catalysts may be used.

The hydrocarbon feed rate is based on the weight of oil per weight of catalyst per unit of time. Usually the term w.(catalyst)/hr./w.(oil) is used. The usual catalyst-to-oil ratio ranges from 7.5 to 1.0. However, this ratio may vary from 0.1 to 100.0 depending upon the feedstock and the operating conditions.

The invention, as well as its many advantages, will be further understood by reference to the following detailed description and single figure showing a flow diagram of a preferred mode of practicing the invention.

Referring to the figure, a transfer line reactor 10 is shown. The transfer line reactor 10 provides a catalytic reaction zone. The lower end of the transfer line reactor 10 is closed by a plate member 12 through which extend horizontally spaced apart inlet means 14 which extend into the reactor 10 past the point where the line 16, through which catalyst is introduced into the transfer line reactor 10, connects thereinto adjacent the end closed by the plate member 12.

A feed line 18 controlled by valve 20 is connected to a feed source (not shown). Steam inlet lines 22 lead into the lower portion of transfer line reactor 10. Steam is introduced through steam inlet lines 22 to fluidize the catalyst introduced by line 16.

The transfer line reactor 10 is provided with an outlet 24 which discharges into a vessel 26 wherein a rough separation is made between the catalyst and the cracked product, the catalyst fines being separated from the cracked product by a cyclone separation means 28 provided with a dip leg 30 which discharges the catalyst into the vessel 26.

The crude products are discharged from the vessel 26 by way of line 32 and are introduced thereby into a fractionator 34 which may be a plurality of fractional distillation zones suitably equipped with the auxiliary equipment usually associated with commercial distillation towers. Fractionator 34 is provided with lines 36, 38, 40, and 42 by way of which the various connected products may be withdrawn. Thus, line 36 may discharge the light fractions including gas; lines 38 and 40 may discharge the intermediate fractions. The heavy fractions which may include any catalyst carried over from the cyclone separator 28 may be discharged by line 42. It may be desirable to recycle the intermediate and heavy fractions to the transfer line reactor 10.

The catalysts discharged by outlet 24 and by dip leg 30 flow downwardly into a stripper section 44 of vessel 26. The stripper section 44 is provided with baffles 46 and with a stream inlet line 48 to provide stripping steam with the downwardly moving catalysts to remove volatiles, such as vaporizable hydrocarbons, therefrom. The catalysts, substantially free of volatiles, are discharged from the stripper section 44 by line 50 and introduced into line 52 wherein they are mixed with air by manipulation of valve 54. Line 52 carries the catalyst and air mixture into a regenerator 56 wherein the catalysts are regenerated for reuse by burning off the nonvolatile materials such as coke.

The regenerated catalysts are withdrawn from regenerator 56 by line 16 controlled by valve 58 and are introduced thereby into reactor 10.

In accordance with the present invention, a carbon monoxide feed line 60 controlled by valve 62 is used for the introduction of carbon monoxide into feed line 18 and into transfer line reactor 10. The amount of carbon monoxide introduced into the transfer line reactor 10 is in sufficient quantity to maintain a slight excess of carbon monoxide throughout the catalytic reaction zone. The carbon monoxide causes increased formation of aromatics and olefins. Preferably, the amount of carbon monoxide introduced into the catalytic reaction zone provided by transfer line reactor 10 ranges from 0.00005 to 0.05 part by weight per unit weight of hydrocarbon oils fed to the catalytic reaction zone.

Several injection points may be used, if needed, to maintain adequate distribution of the carbon monoxide throughout the reaction zone. The carbon monoxide injected may be obtained from a source outside the cracking process, or the carbon monoxide may be obtained by taking a suitable portion of the spent catalysts from the reaction zone and burning the spent catalysts with oxygen or air in sufficient amounts for complete combustion of the carbon to yield carbon monoxide in the flue gas and then recycling this carbon monoxide rich flue gas to the reaction zone.

Runs were made on a standard fluid testing unit comparing the process of this invention with a process using substantially the same conditions but with the addition of nitrogen rather than carbon monoxide. A standard gas oil feed was used for both runs. The significant results of the runs are shown in Table I.

*Table I*

| Gas Added | Nitrogen | Carbon Monoxide |
|---|---|---|
| Conversion to IBP—400° F. Gasoline, Volume Percent | 52.7 | 54.6 |
| Aromatics in IBP—400° F., bbls./1,000 bbls. Feed | 170.7 | 176.3 |
| Olefins in IBP—400° F., bbls./1,000 bbls. Feed | 228.7 | 241.8 |
| Percent Gain in Aromatics, Volume Percent | | 3.3 |
| Percent Gain in Olefins, Volume Percent | | 7.3 |

The amount of carbon monoxide added was approximately 0.02 part by weight of carbon monoxide introduced into the catalytic reaction zone per unit of standard gas oil fed to the catalytic reaction zone.

The data in Table I show that this new process as described herein is more selective to aromatics by 3.3 volume percent and is also more selective to olefins by 7.3 volume percent.

I claim:

In a process for the catalytic cracking of hydrocarbon oils to form lower boiling products wherein the hydrocarbon oil to be cracked is passed through a catalytic reactor under conventional cracking conditions of temperature, pressure, and flow rate and with the use of a catalyst from the group consisting of silica-alumina, silica-magnesia and silica-zirconia, the improvement of increasing the selectivity to aromatics and olefins comprising introducing carbon monoxide into said catalytic reactor in an amount ranging from 0.00005 to 0.05 part by weight per unit weight of hydrocarbon oils fed to the catalytic reactor to effect maximum formation of aromatics and olefins, and recovering from said catalytic reactor effluents containing the products of the cracking reaction.

References Cited by the Examiner

UNITED STATES PATENTS

| 1,966,790 | 7/1934 | Ellis | 208—108 |
| 2,385,326 | 9/1945 | Bailey | 208—163 |
| 2,450,753 | 10/1948 | Guyer | 208—129 |
| 3,033,778 | 5/1962 | Frilette | 208—120 |

DELBERT E. GANTZ, *Primary Examiner.*

ALPHONSO D. SULLIVAN, *Examiner.*